UNITED STATES PATENT OFFICE.

GEORGE C. FURNESS, OF NEW YORK, N. Y., ASSIGNOR TO ELECTRO METALLURGICAL COMPANY, OF NIAGARA FALLS, NEW YORK, A CORPORATION OF WEST VIRGINIA.

PROCESS OF MAKING FERROSILICON.

1,284,645.  Specification of Letters Patent.  Patented Nov. 12, 1918.

No Drawing.   Application filed March 26, 1918. Serial No. 224,802.

*To all whom it may concern:*

Be it known that I, GEORGE C. FURNESS, a citizen of the United States, residing at New York, in the county of New York and State of New York, have invented certain new and useful Improvements in Process of Making Ferrosilicon, of which the following is a specification.

This invention relates to the manufacture of ferro-silicon in electric resistance furnaces of the type having deeply imbedded electrodes, and comprises an improvement in the preparation or compounding of the charge to be smelted.

In the commercial operation of large ferro-silicon furnaces, particularly those of the continuous or semi-continuous type, it is essential for efficient work that certain operating conditions be provided, notably the following: The charge (in common practice comprising quartzite or other form of silica; anthracite, coke, charcoal, or similar reducing agent high in fixed carbon; and a source of iron which may be either scrap steel or iron ore;) should have a relatively low electrical conductivity, in order that the electrodes may be deeply imbedded therein, whereby they are not only shielded from atmospheric oxidation, but the smelting zone is established well below the surface of the charge and in an advantageous location for conserving the heat. Since, however, the reduction of silica (as well as of iron ore when present) is accompanied by an abundant evolution of gaseous reaction products, chiefly carbon monoxid, the above conditions can be fulfilled only when the charge is freely permeable to the furnace gases, or in other words, when it is in the form of relatively coarse fragments or aggregates. This requirement has led to efforts to prepare the charge for furnaces of this type in the form of briquets or agglomerates, since the direct employment of relatively large fragments of anthracite or coke so far increases the electrical conductivity of the charge as to interfere with the deep bedding of the electrodes and otherwise to disturb the operation.

I have discovered that the operation of producing ferro-silicon in electric furnaces may be improved and rendered more efficient by introducing into the electric furnace charge a suitable proportion of bituminous or soft coal, in substitution for a portion of the anthracite coal, coke or charcoal, or mixtures thereof, constituting the reducing agent. Soft coal in proportion to supply 10% or upward of the total fixed carbon of the charge may be used, proportions considerably in excess of 10% being most advantageous in practice. A representative charge in accordance with my invention will comprise for example: silica in the form of crushed quartzite; charcoal, coke or equivalent reducing agent high in fixed carbon; and scrap steel or iron ore; together with a sufficient quantity of bituminous coal to furnish, say 20% to 40% of the total fixed carbon requirements of the charge. The total fixed carbon will preferably be slightly in excess of the theoretical reaction requirements. For example, assuming the iron component to be supplied as scrap steel which does not consume carbon for reduction, the reaction taking place in the electric furnace may be thus indicated:

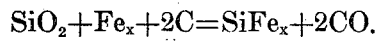

$$SiO_2 + Fe_x + 2C = SiFe_x + 2CO.$$

In this reaction 24 parts of carbon are theoretically required for the reduction of about 60 parts of silica, and the present invention contemplates supplying a material portion of this carbon as bituminous coal admixed with the charge. In case iron ore is used instead of scrap steel, the proportion of fixed carbon required will of course be correspondingly larger.

Certain advantages secured in the practice of this invention are the following: As compared with anthracite, coke or charcoal, bituminous coal is a relatively high-resistance reducing agent and may, therefore, be introduced into the charge in much coarser form than is practicable with such materials high in fixed carbon, lumps up to the size of the fist being used without interfering materially with the current conditions. The addition of bituminous coal in relatively coarse fragments or lumps tends, therefore, to form a highly permeable, free and open charge, which allows deeper bedding of the electrodes and hence a furnacing operation which is both electrically and thermally more efficient. The gas evolved from the soft coal burns at the top of open furnaces and the gas envelop tends to minimize the heat losses at this point; or in closed furnaces the volatile values from the bituminous coal are recoverable, as in by-product coking oven practice. The advantages above noted are, of course, realized to a greater or lesser extent in the manufacture of other ferro-alloys, in so far as the operation involves reduction by carbon in the electric-resistance furnace; but they are particularly important in ferro-silicon manufacture, since the ferro-silicon charge requires a rather high percentage of carbon, which tends to impart to it an objectionably high degree of electrical conductivity.

I claim:—

1. Process of making ferro-silicon, consisting in smelting in an electric furnace a charge comprising silica, a reducing agent high in fixed carbon, a source of iron, and bituminous coal.

2. Process of making ferro-silicon, consisting in smelting in an electric furnace a charge comprising silica, a reducing agent high in fixed carbon, a source of iron, and bituminous coal, the bituminous coal in proportion to supply upward of 10% of the fixed carbon requirements of the reaction.

3. Process of making ferro-silicon, consisting in smelting in an electric furnace a charge comprising silica, a reducing agent high in fixed carbon, a source of iron, and bituminous coal, the bituminous coal in coarser sub-division than the balance of the carbonaceous reducing agent.

4. Process of making ferro-silicon, consisting in smelting in an electric resistance furnace between deeply embedded electrodes a charge comprising silica, a reducing agent high in fixed carbon, a source of iron, and bituminous coal.

5. Process of making ferro-silicon, consisting in smelting in an electric resistance furnace between deeply embedded electrodes a charge comprising silica, a reducing agent high in fixed carbon, a source of iron, and bituminous coal, the bituminous coal in proportion to supply upward of 10% of the fixed carbon requirements of the reaction.

6. Process of making ferro-silicon, consisting in smelting in an electric resistance furnace between deeply embedded electrodes a charge comprising silica, a reducing agent high in fixed carbon, a source of iron, and bituminous coal, the bituminous coal in coarser sub-division than the balance of the carbonaceous reducing agent.

In testimony whereof, I affix my signature.

GEORGE C. FURNESS.